United States Patent [19]
Yaeger et al.

[11] Patent Number: 5,859,925
[45] Date of Patent: *Jan. 12, 1999

[54] CLASSIFYING SYSTEM HAVING A SINGLE NEURAL NETWORK ARCHITECTURE FOR MULTIPLE INPUT REPRESENTATIONS

[75] Inventors: Larry S. Yaeger, Los Gatos; Brandyn Webb, Oceanside, both of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 512,060

[22] Filed: Aug. 8, 1995

[51] Int. Cl.$^6$ .................................................... G06K 9/80
[52] U.S. Cl. .......................... 382/158; 382/161; 706/26
[58] Field of Search .................................. 382/158, 159, 382/227, 224, 161, 187, 190, 202, 203, 206; 706/15–43

[56] References Cited

U.S. PATENT DOCUMENTS

| | | | |
|---|---|---|---|
| 5,239,594 | 8/1993 | Yoda ........................................ | 382/158 |
| 5,337,370 | 8/1994 | Gilles et al. ............................... | 382/14 |
| 5,418,864 | 5/1995 | Murdock et al. .......................... | 382/307 |

OTHER PUBLICATIONS

Anthony Ralston, Edwin D. Reilly, Jr., Encyclopedia of Computer Science and Engnpeering, Van Norstrand Rewhold Company, 1983, pp. 124–125.

Frank Ayres, Jr., Theory and Problems of Matrices, Schaum Publishing Co., 1962, p. 67.

J. E. Tierney; N. Revell ; *Printed Cyrillic Character Recognition System*; 1994; Neural Networks, 1994 International Conference; vol. 6; pp. 3856–3861.

*Primary Examiner*—Leo H. Boudreau
*Assistant Examiner*—Brian P. Werner
*Attorney, Agent, or Firm*—Burns, Doane, Swecker & Mathis, L.L.P.

[57] ABSTRACT

A classification system is provided for combining multiple input representations by a single neural network architecture. In such a classification system having a single neural network architecture, classification channels corresponding to various input representations may be integrated through their own and shared hidden layers of the network to produce highly accurate classification. The classification system is particularly applicable to character classifying applications which use stroke and character image features as the main classification criteria, along with scalar features such as stroke count and aspect ratio features as secondary classification. The classification channels corresponding to the scalar features may be cross wired to the classification channels corresponding to the main input representations for further improving the accuracy of the classification output. Because a single neural network architecture is used, only one, standard training technique is needed for this classification system, special data handling is minimized, and the training time can be reduced, while highly accurate classification is achieved.

34 Claims, 2 Drawing Sheets

CLASSIFYING SYSTEM HAVING A SINGLE NEURAL NETWORK ARCHITECTURE FOR MULTIPLE INPUT REPRESENTATIONS

FIELD OF THE INVENTION

The present invention is directed to a classifying system having a single neural network architecture for combining separate representations of an input pattern, which automatically determines the appropriate relevance for each of the contributing representations. More particularly, a character classification system is provided which supports multiple input representations for a variety of stroke recognition features, character image features, and scalar features.

BACKGROUND OF THE INVENTION

As the functionality of neural networks continues to be expanded, the applications for neural networks increase. For example, neural networks may be applied to pattern recognition applications such as character recognition, speech recognition, remote sensing, geophysical prospecting and medical analysis, as well as many other applications. For each of these applications, classification algorithms are available based on different theories and methodologies used in the particular area. In applying a classifier to a specific problem, varying degrees of success with any one of the classifiers may be obtained. To improve the accuracy and success of the classification results, different techniques for combining classifiers have been studied. Nevertheless, problems of obtaining a high classification accuracy within a reasonable amount of time exist for the present classifying combination techniques and an optimal integration of different types of information is therefore desired to achieve high success and efficiency.

To this end, combinations of multiple classifiers have been employed. In early combination techniques, a variety of complementary classifiers were developed and the results of each individual classifier were analyzed by three basic approaches. One approach uses a majority voting principle where each individual classifier represents a score that may be assigned to one label or divided into several labels. Thereafter, the label receiving the highest total score is taken as the final result. A second approach uses a candidate subset combining and re-ranking approach where each individual classifier produces a subset of ranked candidate labels, and the labels and the union of all subsets are re-ranked based on their old ranks in each subset. A third approach uses Dempster-Shafer (D-S) theory to combine several individual distance classifiers. However, none of these approaches achieve the desired accuracy and efficiency in obtaining the combined classification result.

Another example of combining multiple classifiers is a multisource connectionist pattern classifier having a Meta-Pi architecture. In the Meta-Pi architecture, a number of source-dependent modules are integrated by a combinational superstructure which is referred to as the Meta-Pi combinational superstructure because of the multiplicative functions performed by its output units. FIG. 1 illustrates an example of the Meta-Pi architecture. In this architecture, a signal is input to the module networks, $Net_1$, $Net_2$, ... $Net_k$ which classify the input signals by a Meta-Pi network (Meta-Pi Net). Source-dependent module output units $\{\rho_{k,1}, \rho_{k,2}, \ldots \rho_{k,c}\}$ of each of the module networks are linked to global outputs $O_1, O_2, \ldots O_c$ via their respective Meta-Pi network output units $M_{\pi 1}, M_{\pi 2}, \ldots M_{\pi k}$. In the Meta-Pi training procedure, the source-dependent module output units $\{\rho_{k,1}, \rho_{k,2}, \ldots \rho_{k,c}\}$ are trained on the desired task before the combinational superstructure is trained. Each source-dependent module output unit processes each training sample and presents a classification output to the Meta-Pi superstructure which performs a combinational function on the outputs of the source dependent modules. In other words, at least two different training methods are performed, which requires a significant amount of time and logistical overhead.

The Meta-Pi superstructure processes the training sample and produces a global classification output by forming a linear combination of the module outputs. By using a Meta-Pi back propagation training process tailored for the Meta-Pi network, the parameters (weights or connections) of the Meta-Pi network are adjusted to optimize the global outputs. Accordingly, the Meta-Pi network separately trains the source-dependent classifier modules and the Meta-Pi combinational superstructure. Since the overall training time for the Meta-Pi combinational superstructure is proportional to the number of source-dependent modules combined by the superstructure, a significant amount of training time typically results. Also, the Meta-Pi combinational superstructure requires the output states of its source-dependent modules to be included as part of its training, and the combinational superstructure therefore cannot be trained independent of its modules which further increases the training time and complexity. Even though other systems are known where it is possible to train the classifier modules and the combinational structures simultaneously on different processors (a source identification (SID) network for example), any reduction in the training time that results from the simultaneous training is offset by the decrease in the accuracy of the classification output.

Accordingly, it is desirable to provide a classification system for efficiently and accurately combining multiple representations of an input pattern. Further along these lines, it is desirable to apply the classification system to character recognition analysis which supports multiple input representations.

SUMMARY OF THE INVENTION

These and other objectives are achieved in accordance with the present invention by means of a character recognition system formed of a neural network architecture to which multiple representations of a character are provided as input data. In an exemplary embodiment of the invention, a character classification system analyzes a variety of input representations, such as stroke and character image features, through appropriate combination of their corresponding sets of data in the neural network architecture. Thereby, a character classification of the multiple input representations is achieved with high accuracy and efficiency.

As a further feature of the invention, additional input features may be combined with all of the principle classifier elements by a "cross-wiring" technique. In the character classification system, scalar input features, such as stroke count and aspect ratio, may be combined with the stroke and character image features through their own and shared hidden layers of the single neural network architecture. As a result, the accuracy of the classification results may be further increased.

BRIEF DESCRIPTION OF THE DRAWINGS

The present invention will become more fully understood from the detailed description given hereinbelow and the accompanying drawings which are given by way of illustration only, and thus are not limitative of the present invention, wherein.

DETAILED DESCRIPTION

Before describing in detail the specific features for the embodiments of the present invention, some basic concepts and terminology will be provided that will be used in describing the embodiments of the present invention.

Figure 1:
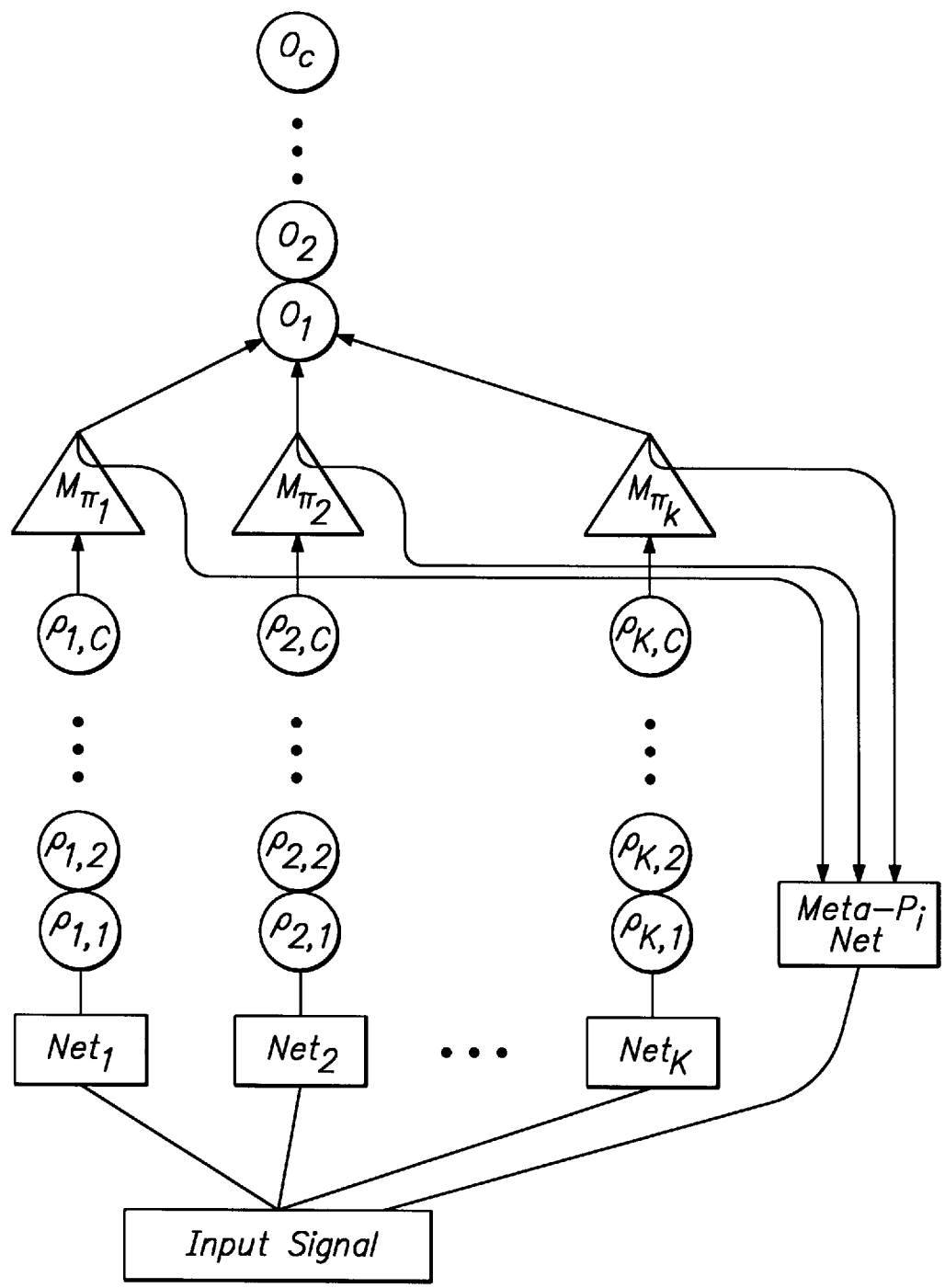
FIG. 1 illustrates a known combinational classifying system having a Meta-Pi network architecture.
Figure 2:
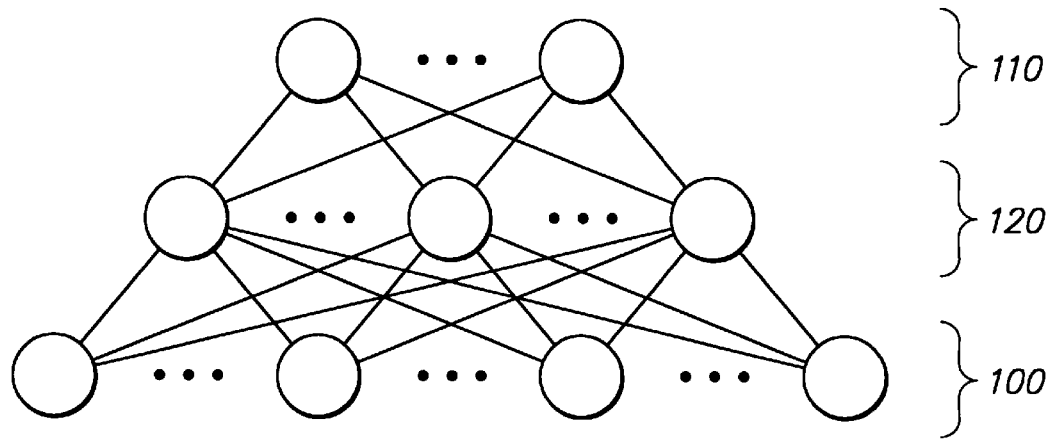
FIG. 2 illustrates a conventional feed-forward neural network.

FIG. 2 illustrates a layered, feed-forward neural network including a plurality of processing units (represented as nodes) arranged in layers. Layer 100 is an input layer, layer 110 is an output layer and layer 120 corresponds to a hidden layer which may represent one or more actual hidden layers between the input and output layers 100 and 110. Each of the processing units in these layers is connected by weighted links and each processing unit computes its output by applying an "activation function" to the inputs received by the processing unit. One example of a training algorithm that may be used for this layered, feed-forward network is a back propagation algorithm.

In computing its outputs, the feed-forward network first sets the input layer 100 according to an input pattern and then the processing units compute their outputs one layer at a time from the input layer 100 to the hidden layer 120 and then to the output layer 110 by applying the activation function to the weighted sum of the outputs from the processing units at the lower layer. The activation function for the processing unit often uses the sigmoid function of:

$$O_{i,j} = \frac{1}{1 + e^{-x}}$$

where $O_{i,j}$ represents the output of a processing unit j at a layer i and x is the weighted sum of the outputs of processing units from one layer below such that $$x = \sum_k \omega_{i-1,k}^{i,j} O_{i-1,k}$$

wherein $\omega_{i-1,k}^{i,j}$ is the weight of the link from a processing unit k at layer i−1 to the processing unit j at layer i. Thereby, each processing unit in the hidden layer 120 represents a different projection from a multi-dimensional input space to a new space whose dimensionality is determined by the number of processing units and the hidden layer 120 of the layered, feed-forward network.

In the training process, the back propagation algorithm trains the layered network by adjusting the link weights of the neural network in response to a set of training examples. Each training example includes an input pattern and an ideal output pattern of the neural network, from that input. The weights are obtained from a memory, adjusted based on the difference between their ideal output and the actual output of the neural network, and the adjusted weights are then restored in the memory. During the training process, the training examples are presented to the network and then the weighted links are adjusted based on the results of the output layer 110. The training process is performed until the results reach an acceptable level. After the training process is completed, the trained network produces outputs based on the training examples for new input patterns by interpolation, approximation or generalization as desired by the user.

Figure 3:
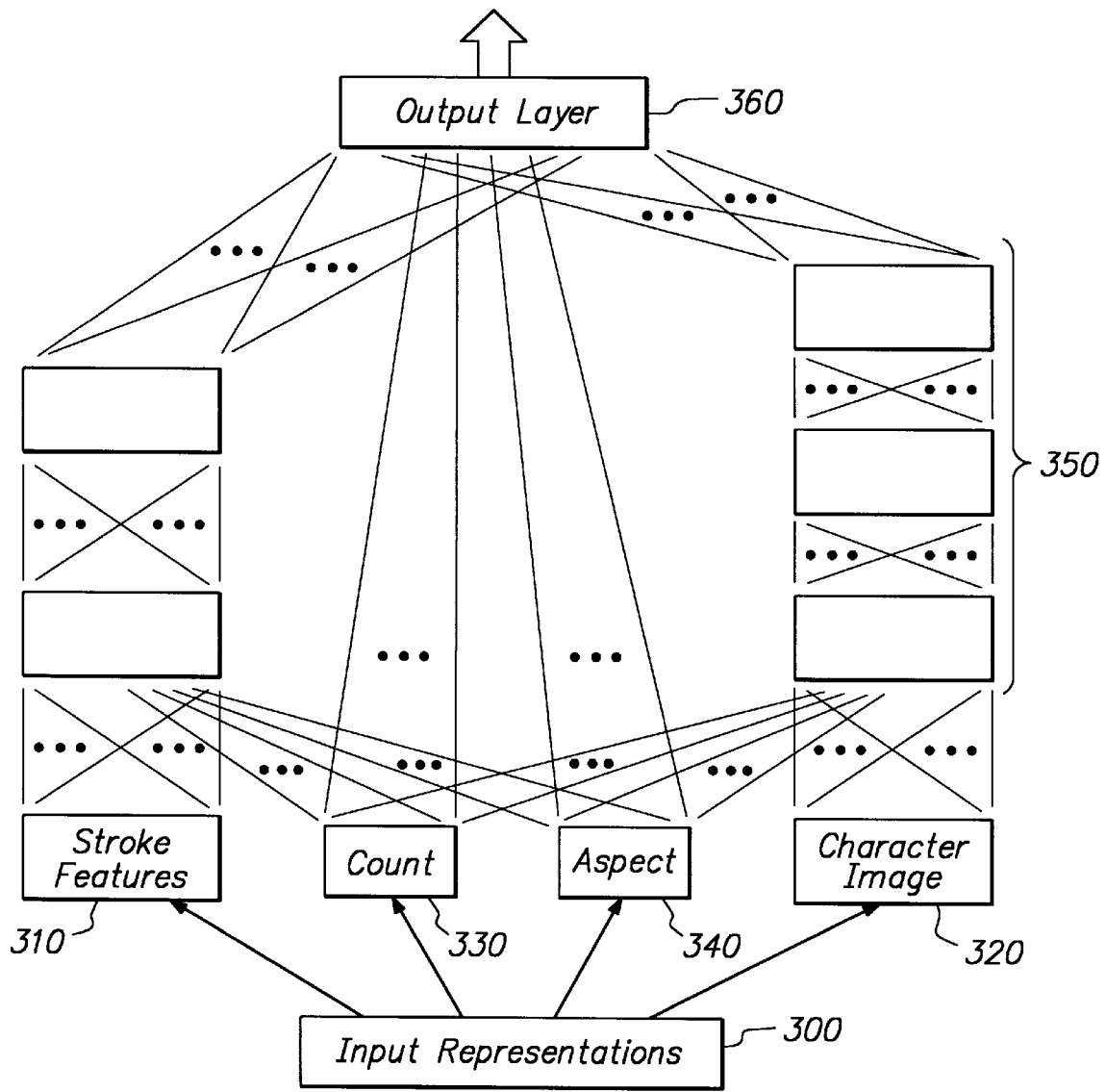
FIG. 3 illustrates a classifying system having multiple input representations within a single network architecture in an embodiment of the present invention.

FIG. 3 illustrates an embodiment of the present invention for a character classification system using multiple input representations. An input unit 300 develops multiple representations of an input pattern, which can include stroke features such as slope or curvature, character image features, a scalar stroke count feature and a scalar aspect ratio feature, for example. The principle input representations in the illustrated embodiment include the stroke features and the character image features. The stroke features and the character image features may be obtained from the multiple input representations by a variety of techniques which are best suited for the particular input representation, and then provided to an input layer of a neural network having stroke feature and character image classification channels 310 and 320. For example, character image features may be developed from input signals which represent whether any character image feature exists in a grid associated with the input pattern, via an antialiased curve-drawing/rendering technique. This information is then provided to the desired classification channel of the neural network.

These principle classification channels 310 and 320 are combined in a neural network architecture which includes a hidden layer 350 (having a plurality of layers) and a single output layer 360 for the resulting classification output. The additional input data provided by this arrangement results in improved character classification accuracy. For instance, while character images might be the most useful information in recognizing certain unique characters, stroke features may also be employed to distinguish characters having confusingly similar images, such as the letters "O" and "Q". The neural network architecture which employs multiple input representations enables the most salient features of each character to be utilized in the recognition process.

An additional advantage is provided by such an architecture, in which the different classification channels 310 and 320 are integrated into the single neural network. Specifically, only one training operation is necessary to determine the appropriate relevance of each of the contributing input representations. For example, a single back propagation gradient descent training technique may be used to train and adjust the weighted links in each channel of the neural network. As a result, a highly accurate and efficient character classification system is provided for multiple input representations.

FIG. 3 illustrates that additional secondary input representations, such as scalar features of stroke count and aspect ratio in the present embodiment, may be integrated with the principle input representations by a cross-wiring structure of the neural network. These secondary input representations may be input to any layer of the neural network for increasing the accuracy of the classification output. As illustrated in FIG. 3, a stroke count classification channel 330 and an aspect ratio classification channel 340 are connected to one or more layers within the hidden layer 350 and/or directly to the output layer 360. The architecture of the neural network supports multiple input representations and various interconnections thereof, as desired by the user. By combining a plurality of input representations through their own and shared hidden layers, highly accurate classification output results are obtained, and a single back-propagation training technique, which can efficiently ascribe relevance to the various input features, and which requires a single, standard training regimen, minimal special data handling, and may require less training time as compared to the time required to train multiple separate classifiers, can be employed.

In addition, other character recognition features may be incorporated into the neural network architecture, as desired by the user, for specific applications. For example, other character recognition features may include density of point measurements, moments, characteristic loci, mathematical transforms (Fourier, Walsh, Hadamard), and skeletons or contours such as loop, end point, junction, arc, concavities, and convexities.

Although the present embodiment is directed to a character representation system, other pattern recognition applications such as speech recognition, remote sensing, geophysical prospecting and medical analysis, as well as other applications using a plurality of classification algorithms may use the single neural network architecture with multiple input representations of the present invention to advantage. For example, a classification system for multiple input representations may be implemented in the single neural network architecture of the present invention which include Fourier descriptors, co-occurrence matrix, power spectrum, movements, contrasts and various structural primitives as the input representations for textural analysis such as remote sensing and scene analysis applications. Also, waveform analysis and recognition applications, such as seismic signal, EEG and ECG, speech recognition and speaker identification, and underwater acoustics may be implemented in a classification system having the single neural network architecture of the present invention which includes input representations such as power spectrum, AR modeling, function approximation, zero crossing, hidden Markov modeling and many types of structural line segments. These features may be integrated in a single neural network architecture corresponding to the specific applications as desired in the further embodiments of the present invention to achieve high accuracy and efficient classification of multiple input representations.

By combining multiple input representations in the single neural network, one standard training process may be used to automatically determine the appropriate relevance of each of the contributing forms of input representations. Because the multiple types of input representations are optimally integrated in the present classification system, special data handling is minimized, a single, standard training technique may be utilized, and the training time may even be reduced while highly accurate classification is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A classification system for classifying input characters, comprising:

an input device which develops a plurality of non-scalar representations of a character to be classified, and at least one scalar representation defining a character recognition feature which is capable of distinguishing different characters from one another; and a neural network having:

a plurality of primary classification channels each having at least one hidden layer of processing nodes, each of said primary classification channels processing a respective one of said non-scalar representations to produce intermediate values indicative of an input character;

an output layer of processing nodes which receives the intermediate values from said plurality of primary classification channels to produce output values representative of the probable classification of an input character; and a secondary classification channel having at least one input node which receives said scalar representation and produces output values that are coupled to said hidden layers of said primary classification channels.

2. The classification system of claim 1 wherein the output values from said secondary channel are also directly coupled to said output layer of said neural network in addition to being coupled to said hidden layers.

3. The classification system of claim 1 wherein said input device develops a plurality of scalar representations of an input character, and said neural network includes a plurality of secondary classification channels respectively associated with said scalar representations.

4. The classification system of claim 1, wherein one of said non-scalar representations comprises character image features.

5. The classification system of claim 4 wherein another one of said non-scalar representations comprises stroke features.

6. The classification system of claim 5 wherein said stroke features include slope.

7. The classification system of claim 5 wherein said stroke features include curvature.

8. The classification system of claim 1 wherein one of said non-scalar representations comprises stroke features.

9. The classification system of claim 1 wherein said scalar representation comprises stroke count.

10. The classification system of claim 1 wherein said scalar representation comprises aspect ratio.

11. A method for classifying input characters, comprising the steps of:

developing a plurality of non-scalar representations of a character to be classified, and at least one scalar representation of said character defining a character recognition feature which is capable of distinguishing different characters from one another;

separately processing said non-scalar representations in respective classification channels of a neural network, each of which has at least one hidden layer of processing nodes, to produce intermediate values indicative of an input character;

coupling values related to said scalar representation to the hidden layer of said classification channels; and processing the intermediate values from said classification channels in an output layer of processing nodes of said neural network, to produce output values representative of the probable classification of the input character.

12. The method of claim 11 wherein the values related to said scalar representation are also directly coupled to said output layer of said neural network in addition to being coupled to said hidden layer.

13. The method of claim 11 further including the steps of developing a plurality of scalar representations of a character, and coupling values related to each of said plural scalar representations to said hidden layers.

14. The method of claim 11 further including the steps of back propagating an error value, derived from said probable classification, through said output layer and each of said classification channels to train said neural network.

15. The classification system of claim 11, wherein one of said non-scalar representations comprises character image features.

16. The classification system of claim 15 wherein another one of said non-scalar representations comprises stroke features.

17. The classification system of claim 16 wherein said stroke features include slope.

18. The classification system of claim 16 wherein said stroke features include curvature.

19. The classification system of claim 11 wherein one of said non-scalar representations comprises stroke features.

20. The classification system of claim 11 wherein said scalar representation comprises stroke count.

21. The classification system of claim 11 wherein said scalar representation comprises aspect ratio.

22. A classification system for classifying input characters, comprising:
   an input device which develops a plurality of representations of a character to be classified, wherein each of said representations defines a character recognition feature which is capable of distinguishing different characters from one another; and
   a neural network having:
      a plurality of primary classification channels each having at least one hidden layer of processing nodes, each of said primary classification channels processing a different one of said representations to produce intermediate values indicative of an input character;
      an output layer of processing nodes which receives the intermediate values from said plurality of primary classification channels to produce output values representative of the probable classification of an input character; and
      a secondary classification channel having at least one input node which receives another one of said representations of said character and produces output values that are coupled to said hidden layers of said primary classification channels.

23. The classification system of claim 22 wherein the output values from said secondary channel are also directly coupled to said output layer of said neural network in addition to being coupled to said hidden layers.

24. The classification system of claim 22 wherein said neural network includes a plurality of secondary classification channels associated with respective ones of said representations and coupled to said hidden layers.

25. The classification system of claim 22, wherein one of said representations comprises character image features.

26. The classification system of claim 25 wherein another one of said representations comprises stroke features.

27. The classification system of claim 26 wherein said stroke features include slope.

28. The classification system of claim 26 wherein said stroke features include curvature.

29. The classification system of claim 22 wherein one of said representations comprises stroke features.

30. The classification system of claim 22 wherein one of said representations comprises stroke count.

31. The classification system of claim 22 wherein one of said representations comprises ratio.

32. A classification system for classifying input characters, comprising:
   an input device which develops a plurality of representations of a character to be classified, including at least one scalar representation of said character; and
   a neural network having:
      a plurality of primary classification channels each having at least one hidden layer of processing nodes, each of said primary classification channels processing a respective one of said representations to produce intermediate values indicative of an input character;
      an output layer of processing nodes which receives the intermediate values from said plurality of primary classification channels to produce output values representative of the probable classification of an input character; and
      a secondary classification channel having at least one input node which receives said scalar representation and produces output values that are coupled to said hidden layers of said primary classification channels and are also directly coupled to said output layer of said neural network.

33. A method for classifying input characters, comprising the steps of:
   developing a plurality of representations of a character to be classified, including at least one scalar representation of said character;
   separately processing said representations in respective classification channels of a neural network, each of which has at least one hidden layer of processing nodes, to produce intermediate values indicative of an input character;
   coupling values related to said scalar representation to the hidden layer of each of said classification channels;
   processing the intermediate values from said classification channels in an output layer of processing nodes of said neural network, to produce output values representative of the probable classification of the input character; and
   directly coupling the values related to said scalar representation to said output layer of said neural network in addition to coupling them to said hidden layer.

34. A classification system for classifying input characters, comprising:
   an input device which develops a plurality of representations of a character to be classified; and
   a neural network having:
      a plurality of primary classification channels each having at least one hidden layer of processing nodes, each of said primary classification channels processing a different one of said representations to produce intermediate values indicative of an input character;
      an output layer of processing nodes which receives the intermediate values from said plurality of primary classification channels to produce output values representative of the probable classification of an input character; and
      a secondary classification channel having at least one input node which receives another one of said representations of said character and produces output values that are coupled to said hidden layers of said primary classification channels and are also directly coupled to said output layer of said neural network.

* * * * *